US008057952B2

(12) United States Patent
Jung et al.

(10) Patent No.: US 8,057,952 B2
(45) Date of Patent: Nov. 15, 2011

(54) POLYMER ELECTROLYTE MEMBRANE, METHOD OF MANUFACTURING THE SAME AND FUEL CELL INCLUDING THE POLYMER ELECTROLYTE MEMBRANE

(75) Inventors: Myung-sup Jung, Yongin-si (KR); Sang-kook Mah, Yongin-si (KR); Do-yun Kim, Yongin-si (KR); Jin-gyu Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1066 days.

(21) Appl. No.: 11/651,828

(22) Filed: Jan. 8, 2007

(65) Prior Publication Data

US 2007/0202375 A1 Aug. 30, 2007

(30) Foreign Application Priority Data

Feb. 25, 2006 (KR) .................. 10-2006-0018513

(51) Int. Cl.
*H01M 8/10* (2006.01)
(52) U.S. Cl. ........ 429/491; 429/493; 429/479; 429/317; 429/310
(58) Field of Classification Search .................. 429/493, 429/491, 479, 317, 310
See application file for complete search history.

(56) References Cited

U.S. PATENT DOCUMENTS

| 5,409,959 | A | 4/1995 | Hwang et al. | |
|---|---|---|---|---|
| 7,052,793 | B2 * | 5/2006 | Formato et al. | 429/535 |
| 7,345,135 | B2 * | 3/2008 | Ishikawa et al. | 429/493 |
| 7,465,780 | B2 | 12/2008 | Jung et al. | |
| 2002/0045085 | A1 * | 4/2002 | Formato et al. | 429/309 |
| 2004/0191602 | A1 * | 9/2004 | Ishikawa et al. | 429/310 |
| 2005/0118479 | A1 | 6/2005 | Yamaguchi et al. | |
| 2005/0271921 | A1 | 12/2005 | Kim et al. | |
| 2007/0082248 | A1 * | 4/2007 | Lee et al. | 429/317 |

FOREIGN PATENT DOCUMENTS

| CN | 1707832 A | | 12/2005 |
|---|---|---|---|
| JP | 60-203603 | | 10/1985 |
| JP | 63-72669 | | 4/1988 |
| JP | 04-157456 | | 5/1992 |
| JP | 6-505477 T | | 6/1994 |
| JP | 2003-263998 | | 9/2003 |
| JP | 2004-10677 | * | 1/2004 |
| JP | 2005-105176 | | 4/2005 |
| JP | 2005-232456 | | 9/2005 |
| JP | 2005-285549 A | | 10/2005 |
| KR | 1020050024812 A | | 3/2005 |
| WO | WO 03/033566 | * | 4/2003 |
| WO | WO 2005/050671 A2 | | 6/2005 |

OTHER PUBLICATIONS

A structural abstract of US 7,345,135 published Mar. 2008.*
Patent Abstracts of Japan, Publication No. 60-203603; Publication Date: Oct. 15, 1985; in the name of Suzuki.
Japanese Office action dated Oct. 10, 2010, for corresponding Japanese Patent application 2007-044193, noting listed references in this IDS.
Nishikubo, T, et al., *Synthesis and Photochemical Reaction of Cyclic Oligomers: Synthesis and Photopolymerization of Novel C-Methylcalix [4] resorcinarene and p-Alkylcalix [n]arene Derivatives Containing Spiro Ortho Ether Groups*, Journal of Polymer Science: Part A: Polymer Chemistry, Dec. 31, 2002, vol. 40, No. 9, pp. 1293-1302.
Japanese Office action dated Sep. 29, 2009, for Japanese application 2006-279041, which corresponds to cross-referenced U.S. Appl. No. 11/580,733.
SIPO Certificate of Patent dated Dec. 8, 2010 for Chinese Patent Application No. 200610162591.8.
SIPO Office action dated Dec. 7, 2010, for Chinese Patent application 200610131779.6, with English translation, which corresponds to cross-referenced U.S. Appl. No. 11/580,733.
SIPO Office action dated Jan. 29, 2010, for Chinese application 200610131779.6, which corresponds to cross-referenced U.S. Appl. No. 11/580,733.
U.S. Office action dated Mar. 3, 2011, for cross reference U.S. Appl. No. 11/580,733, noting listed reference in this IDS.
Maksimov, A., et al., *Supramolecular Catalysts on the Basis of Molecules-Receptors*, Ind. Eng. Chem. Res. (2005), vol. 44, pp. 8644-8653.
Patent Abstracts of Japan and English Machine Translation of Japanese Publication No. 63-72669, listed above.
English Machine Translation of Japanese Publication No. 04-157456, listed above.
Korean Office action dated Sep. 28, 2006, for Korean application 10-2005-0096243, which corresponds to cross-referenced U.S. Appl. No. 11/580,733.

* cited by examiner

*Primary Examiner* — Laura Weiner
(74) *Attorney, Agent, or Firm* — Christie, Parker & Hale, LLP (57) ABSTRACT

A polymer electrolyte membrane, a method of manufacturing the same, and a fuel cell including the polymer electrolyte membrane are provided, wherein the polymer electrolyte forms an interpenetrating polymer network (IPN) of a polymer by simple blending of a hydrophobic polyimide having a reactive terminal group and a hydrophilic aromatic polymer having ion conductivity. The polymer electrolyte membrane has reduced swelling properties due to highly dense crosslinking of polyimide through the reactive terminal group, shows high ion conductivity at low humidity, and has methanol crossover suppressing ability. Accordingly, a fuel cell with improved electric and mechanical properties can be provided.

11 Claims, 1 Drawing Sheet

FIG. 1

POLYMER ELECTROLYTE MEMBRANE, METHOD OF MANUFACTURING THE SAME AND FUEL CELL INCLUDING THE POLYMER ELECTROLYTE MEMBRANE

CROSS-REFERENCE TO RELATED PATENT APPLICATION

This application claims priority to and the benefit of Korean Patent Application No. 10-2006-0018513, filed on Feb. 25, 2006 in the Korean Intellectual Property Office, the disclosure of which is incorporated herein in its entirety by reference.

BACKGROUND OF THE INVENTION

1. Field of the Invention

The present invention relates to a polymer electrolyte membrane, a method of manufacturing the same, and a fuel cell including the polymer electrolyte membrane.

2. Description of the Related Art

Fuel cells may be classified according to the type of electrolyte used therein. Types of fuel cells include polymer electrolyte membrane fuel cells (PEMFCs), phosphoric acid fuel cells, molten carbonate fuel cells, solid oxide fuel cells, and others. The operating temperatures of fuel cells and constituent materials thereof vary depending on the electrolyte type.

According to a method of supplying fuel to an anode, fuel cells can be classified into external reforming type fuel cells in which fuel is supplied to the anode after being converted into hydrogen enrichment gas by a fuel reformer, and internal reforming type fuel cells in which fuel in liquid or gaseous state is directly supplied to the anode.

A representative example of a direct fuel supply type fuel cell is a direct methanol fuel cell (DMFC). In a DMFC, an aqueous methanol solution is used as fuel, and a proton conductive polymer electrolyte membrane is used as an electrolyte. Accordingly, a DMFC is a kind of PEMFC.

PEMFCs are small and light but can realize high output density. Moreover, PEMFCs simplify the structure of a power generating system.

A PEMFC is usually formed of an anode (a fuel cell), a cathode (oxidizer electrode), and a polymer electrolyte membrane disposed between the anode and the cathode. The anode of a PEMFC includes a catalyst layer to facilitate oxidization of fuel, and the cathode of a PEMFC includes a catalyst layer to facilitate reduction of an oxidizer.

The polymer electrolyte membrane of a PEMFC functions as an ion conductor for hydrogen ions to move from the anode to the cathode and as a separator to physically separate the anode and the cathode. Accordingly, the polymer electrolyte membrane needs to have good ion conductivity, electrochemical stability, high mechanical intensity, and thermal stability at operating temperatures, and be easy to be made thin.

SUMMARY OF THE INVENTION

One embodiment of the present invention provides a polymer electrolyte membrane having improved ion conductivity and which can efficiently prevent methanol crossover.

Another embodiment of the present invention also provides a method of manufacturing the polymer electrolyte membrane.

A further embodiment of the present invention also provides a fuel cell including the polymer electrolyte membrane, thus having reduced methanol crossover.

According to an embodiment of the present invention, a polymer electrolyte membrane is provided comprising: a polyimide having a reactive terminal group; and an ion conductive polymer.

According to another embodiment of the present invention, a method of preparing a polymer electrolyte membrane is provided, the method comprising: providing a composition for forming a polymer electrolyte membrane comprising a polyamic acid having a reactive terminal group, an ion conductive polymer, and a solvent; coating the composition for forming the polymer electrolyte membrane to a substrate; and heat-treating the coated composition for forming the polymer electrolyte membrane.

According to another embodiment of the present invention, a fuel cell is provided comprising: a cathode; an anode; and a polymer electrolyte membrane interposed between the cathode and the anode, wherein the polymer electrolyte membrane includes polyimide having a reactive terminal group and an ion conductive polymer.

BRIEF DESCRIPTION OF THE DRAWINGS

The above and other features and advantages of the present invention will become more apparent by describing in detail exemplary embodiments thereof with reference to the attached drawing in which.

DETAILED DESCRIPTION

One embodiment of the present invention relates to a polymer electrolyte membrane including a polyimide having a reactive terminal group and an aromatic polymer having ion conductivity, a method of preparing the polymer electrolyte membrane, and a fuel cell including the polymer electrolyte membrane. Specifically, the polymer electrolyte forms an interpenetrating polymer network (IPN) of a polymer by simple blending of a hydrophobic polyimide and a hydrophilic aromatic polymer having ion conductivity. The resulting polymer electrolyte membrane has one or more of the following properties: a reduced swelling effect due to highly dense crosslinking of the polyimide through the reactive terminal group, high ion conductivity at low humidity, and methanol crossover suppressing ability.

According to an embodiment of the present invention, the polyimide is a compound having a repeating unit represented by Formula 1 below:

Formula 1 where m is in the range of 0.01 to 1, n is in the range of 0 to 0.99, and m+n=1, average copolymerization p is in the range of 10 to 10,000,
X and X' are each independently Y and Y' are each independently;

$X_1, X_2, X_3, X_4, X_5, X_6, X_7, X_8, Y_1, Y_2, Y_3, Y_4, Y_5, Y_6, Y_7, Y_8, R_1, R_2, R_3,$ and $R_4$ are each independently selected from the group consisting of a hydrogen atom, a halogen atom, a $C_1$-$C_{30}$ alkyl group, a $C_1$-$C_{30}$ halogenated alkyl group, a $C_6$-$C_{30}$ aryl group, and a $C_6$-$C_{30}$ halogenated aryl group;
$R_5$ and $R_6$ are each independently selected from the group consisting of a $C_1$-$C_{30}$ alkylene group and a $C_1$-$C_{30}$ halogenated alkylene group;
Q and Q' each represent simply a chemical bond or are each a group selected from the group consisting of —O—, —CO—, —SO$_2$—, —S—, -(T)$_a$-, —(OT)$_a$-, -(TO)$_a$—, and —(OTO)$_a$— (where T is an alkylene group substituted with one selected from a halogen atom and $C_1$-$C_{10}$ halogenated alkyl group or an arylene group substituted with one selected from a halogen atom and $C_1$-$C_{10}$ halogenated alkyl group, and a is an integer in the range of 1 to 10);
Z and Z' are each independently selected from C, Si, Ge, Sn, and Pb; and
E is a univalent reactive terminal group having a carbon-carbon double bond or triple bond, derived from monoamine compound or monoanhydride compound.

In one embodiment, in Formula 1, X and X' are each independently selected from the group consisting of In an embodiment, in Formula 1, Y and Y' are each independently selected from the group consisting of

The reactive terminal group is a reactive functional group introduced by injecting a carbon-carbon double bond, or monoamine compound or monoanhydride as a univalent reactive terminal group having a triple bond during the preparation of the polyimide, which will be described later. The reactive terminal group is cross-linked with another reactive terminal group of a monomer in a hardening process, thereby increasing the property of the final polymer membrane. When a monomer having the reactive functional group is input, the molecular weight of the polyimide can be adjusted to a desired range, and thus the properties of the polyimide can be optimized and the viscosity of a final polyimide electrolyte solution can be reduced. Thus, during the hardening process, a cross-linkage is formed between reactive blocking groups, thereby significantly improving the physical and chemical properties of an electrolyte membrane, for example, resistance to heat, resistance to absorption, resistance to chemicals, mechanical intensity, etc.

Non-limiting examples of the monoamine compound or the monoanhydride compound include 5-norbornene-2,3-dicarboxylic anhydride (NDA), 3,4,5,6-tetrahydrophthalic anhydride, cis-1,2,3,6-tetrahydrophthalic anhydride, maleic anhydride (MA), 2,3-dimethylmaleic anhydride (DMMA), citraconic anhydride (CA), itaconic anhydride (IA), ethynyl aniline (EA), and maleic imide. In one embodiment, the composition may include, 5-norbornene-2,3-dicarboxylic anhydride (NDA), itaconic anhydride (IA), maleic anhydride (MA), or 2,3-dimethylmaleic anhydride (DMMA). The monoamine compound or the monoanhydride compound can be used alone or in combination of at least two.

The polymer electrolyte membrane includes an ion conductive polymer as a matrix besides the polyimide having the reactive terminal group. The ion conductive polymer can be selected from known polymers that can be used as a polymer electrolyte membrane. In one embodiment, the ion conductive polymer may be an aromatic polymer having an ion group.

Examples of the ion conductive polymer include sulfonated poly(arylene ether sulfone), sulfonated poly(arylene ether ketone), sulfonated polyetheretherketone, sulfonated polyethersulfone, sulfonated polyetherethersulfone, perfluorated polymer, polyvinylidene fluoride, polyvinylidene fluoride-co-hexafluoro propylene, and copolymers including one or more monomers constituting above polymers, but are not limited thereto.

A non-limiting example of the sulfonated poly(arylene ether sulfone) may be the compound represented by Formula 2:

Formula 2

In one embodiment, in Formula 2, p and q represent mole fractions; p is in the range of 0.01 to 0.99, preferably 0.3 to 0.7, and q is in the range of 0.01 to 0.99, preferably 0.3 to 0.7, and p+q is 1.

In one embodiment, the sulfonated poly(arylene ether sulfone) has an average polymerization of 10 to 10,000.

A non-limiting example of the sulfonated poly(arylene ether ketone) may be the compound represented by Formula 3 below:

Formula 3

In one embodiment, in Formula 3, p and q represent mole fractions; p is in the range of 0.01 to 0.99, preferably 0.3 to 0.7, and q is in the range of 0.01 to 0.99, preferably 0.3 to 0.7, and p+q is 1.

In an embodiment, the sulfonated poly(arylene ether sulfone) has an average polymerization in the range of 10 to 10,000.

The content of the polyimide having a reactive terminal group in the polymer electrolyte membrane according to an embodiment of the present invention may be in the range of 20 to 400 parts by weight based on 100 parts by weight of the ion conductive polymer, preferably 50 to 200 parts by weight. When the content of the polyimide having the reactive terminal group is less than 20 parts by weight with respect to 100 parts by weight of the ion conductive polymer, crossover of methanol is hardly reduced. When the content of the polyimide having the reactive terminal group is greater than 400 parts by weight, the hydrogen ion conductivity is too low.

The polymer electrolyte membrane according to one embodiment of the present invention forms an interpenetrating polymer network (IPN) in which molecule chains of the ion conductive polymer are twined around each other in a three-dimensional network of the polymer which is obtained by crosslinking polyimides having a reactive terminal group.

According to an embodiment of the present invention, the cross-linkage mechanism of a polyimide having maleiimide as a reactive terminal group can be represented as follows.

As a result, the shape retaining ability of the polymer electrolyte membrane increases significantly and thus the thermal and chemical properties thereof are improved, and the swelling of the polymer electrolyte membrane and the crossover of methanol can be suppressed by highly dense cross-linkage between terminal groups.

Also, since the polyimide is obtained by imidization of polyamic acids, hydrophilic polyamic acids and ion conductive polymers are mixed in a composition for forming a polymer electrolyte membrane, and thus a uniform composition can be formed without phase separation.

The polymer electrolyte membrane according to one embodiment of the present invention may further include a solid acid besides the polyimide having the reactive terminal group as described above and the ion conductive polymer. In an embodiment, the solid acid may be one of the compounds represented by Formulae 4 through 6 below:

Formula 4

Formula 5

Formula 6

In an embodiment, the content of the solid acid may be in the range of 0.1 parts by weight to 10 parts by weight based on 100 parts by weight of the ion conductive copolymer, preferably 1 part by weight to 30 parts by weight. When the content of the solid acid is less than 0.1 parts by weight based on 100 parts by weight of the ion conductive polymer, the effect as a solid acid may be minimal. When the content of the solid acid is greater than 40 parts by weight based on 100 parts by weight, the solid acid may leak out.

Hereinafter, a method of preparing the polymer electrolyte membrane according to an embodiment of the present invention will be described.

The method of preparing the polymer electrolyte membrane includes: providing a composition for forming the polymer electrolyte membrane including a polyamic acid, an ion conductive polymer, and a solvent; coating the composition for forming the polymer electrolyte membrane to a substrate; and heating the coated composition for forming the polymer electrolyte membrane.

First, the composition for forming the polymer electrolyte membrane is obtained by mixing the polyamic acid having a reactive terminal group, the ion conductive polymer, and the solvent.

According to an embodiment of the present invention, the polyamic acid having the reactive terminal group is a compound including a repeating unit represented by Formula 7 below:

Formula 7

In Formula 7, m is in the range of 0.01 to 1, n is in the range of 0 to 0.99, and m+n=1;

average copolymerization p is in the range of 10 to 10,000;

X and X' are each independently or

Y and Y' are each independently

,

-continued or $X_1, X_2, X_3, X_4, X_5, X_6, X_7, X_8, Y_1, Y_2, Y_3, Y_4, Y_5, Y_6, Y_7, Y_8, R_1, R_2, R_3$, and $R_4$ are each independently selected from the group consisting of a hydrogen atom, a halogen atom, a $C_1$-$C_{30}$ alkyl group, a $C_1$-$C_{30}$ halogenated alkyl group, a $C_6$-$C_{30}$ aryl group, and a $C_6$-$C_{30}$ halogenated aryl group;
$R_5$ and $R_6$ are each independently selected from the group consisting of a $C_1$-$C_{30}$ alkylene group and a $C_1$-$C_{30}$ halogenated alkylene group;
Q and Q' each represent simply a chemical bond or are each a group selected from the group consisting of —O—, —CO—, —SO$_2$—, —S—, (T)$_a$-, —(OT)$_a$-, -(TO)$_a$—, and —(OTO)$_a$— (where T is an alkylene group substituted with one selected from a halogen atom and $C_1$-$C_{10}$ halogenated alkyl group or an arylene group substituted with one selected from a halogen atom and $C_1$-$C_{10}$ halogenated alkyl group, and a is an integer in the range of 1 to 10);
Z and Z' are each independently selected from C, Si, Ge, Sn, and Pb; and
E is a univalent reactive terminal group having a carbon-carbon double bond or triple bond, derived from monoamine compound or monoanhydride compound.

In an embodiment, the polyamic acid can be synthesized by reacting a tetracarboxyl acid dianhydride compound represented by at least one of Formulae 8 and 9 below; a diamine compound represented by at least one of Formulae 10 and 11 below; and a monoamine compound or monoanhydride compound having at least one carbon-carbon double bond to a polar solvent:

Formula 8

Formula 9 where X and X' are as defined in Formula 7.

Formula 10

Formula 11 where Y and Y' are as defined in Formula 7.

A non-limiting example of the reactive terminal group and E may be at least one selected from the group of the following terminal groups.

A non-limiting example of polyamic acid having a reactive terminal group according to an embodiment of the present invention can be a compound represented by Formula 12 or 13:

Formula 12

In Formula 12, the average polymerization p is in the range of 10 to 10,000, and Y is Formula 13

In Formula 13, the average polymerization p is in the range of 10 to 10,000.

In an embodiment, the polyamic acid can be synthesized by reacting the tetracarboxyl acid dianhydride compound of at least one of Formulae 8 and 9 above; the diamine compound of at least one of Formulae 10 and 11 above; and the monoamine compound or monoanhydride compound having at least one carbon-carbon double bond to a polar solvent at a temperature in the range of 0° C. to 5° C., for more than 16 hours, and then raising the temperature to a value in the range of 160 to 180° C. and thermosetting for 2 to 5 hours.

Non-limiting examples of the tetracarboxyl acid dianhydride compound having the structure of Formula 8 or 9 include pyromellitic dianhydride, 3,3,4,4-biphenyl tetracarboxylic dianhydride, 4,4-oxydiphthalic dianhydride, 3,3',4,4'-benzophenone tetracarboxylic dianhydride, 2,2-bis(3,4-benzenedicarboxylic anhydride)perfluoropropane, 4,4-sulfonyldiphthalic dianhydride, and combinations thereof. In one embodiment, the compound may be, pyromellitic dianhydride, 3,3,4,4-biphenyl tetracarboxylic dianhydride or 4,4-oxydiphthalic dianhydride.

Non-limiting examples of the diamine compound having the structure of Formula 10 or 11 include: 1,3-diamino-4-dihydroxybenzene, 1,3-diamino-5-dihydroxybenzene, 3,3'-diamino-4,4'-dihydroxybiphenyl, 4,4'-diamino-3,3'-dihydroxybiphenyl, 2,2-bis(3-amino-4-hydroxyphenyl)propane, bis(4-amino-3-hydroxyphenyl) propane, bis(3-amino-4-hydroxyphenyl)sulfone, bis(4-amino-3-hydroxyphenyl)sulfone, bis(3-amino-4-hydroxyphenyl)ether, bis(4-amino-3-hydroxyphenyl)ether, 2,2-bis(3-amino-4-hydroxyphenyl) hexafluoropropane, and combinations thereof. In one embodiment, the compound is, 2,2-bis(3-amino-4-hydroxyphenyl)hexafluoropropane.

Examples of the solvent in the composition for forming the polymer electrolyte membrane according to an embodiment of the present invention include N-methyl-2-pyrrolidone, N,N'-dimethyl acetamide, dimethylformamide, methylsulfoxide, dimethylsulfoxide, etc., but are not limited thereto and at least two of these can be used in combination. In one embodiment, the content of the solvent may be in the range of 50 to 90 weight % based on the composition for forming the polymer electrolyte membrane.

In an embodiment, the content of the monoamine compound or the monoanhydride compound may be in the range of 0.05 to 0.5 mol with respect to 1 mol of the diamine compound, and preferably, 0.1 to 0.3 mol. When the content of the monoamine compound or the monoanhydride compound is less than 0.05 mol, the effect of introducing the terminal reaction group is minimal. When the content of the monoamine compound or the monoanhydride compound is greater than 0.5, the molecular weight of polyimide is too small and thus the film properties are deteriorated.

When the content of the solvent is less than 1 weight % based on the composition for forming the polymer electrolyte membrane, the coating quality and viscosity of the polymer electrolyte membrane can be deteriorated. When the content of the solvent is greater than 99 weight %, the content of the solid contents becomes too small.

The composition for forming the polymer electrolyte membrane is coated on a substrate. The coating method is not particularly limited and a known method such as spin coating, bar coating, or the like can be used.

Next, the coated composition for forming the polymer electrolyte membrane is heated.

In one embodiment, the heat treatment is a hard baking process performed at a temperature in the range of 220 to 270° C. When the temperature of the heat treatment is less than 220° C., the polymer electrolyte membrane may not be sufficiently hardened. When the temperature of the heat treatment is greater than 270° C., the sulfonic group contained in the polymer electrolyte membrane itself is dissolved. The time of the heat treatment can vary according to the temperature of the heat treatment, and in one embodiment is in the range of 5 minutes to 24 hours.

The composition for forming the polymer electrolyte membrane may undergo a pre-heat treatment process before the above-described hard baking process. In an embodiment, the pre-heat treatment process comprises removing a portion of the solvent from the resultant material which is coated with the composition for forming the polymer electrolyte membrane, and is a soft baking process at a temperature in the range of 60 to 110° C. When the temperature of the pre-heat treatment process is less than 60° C., too much time is required for drying the solvent. When the temperature of the pre-heat treatment process is greater than 110° C., the solvent is too quickly removed, thereby causing irregularity of the film.

The time of the heat treatment process varies according to the heat treatment temperature, and in one embodiment is in the range of 0.5 to 4 hours.

The polymer electrolyte membrane obtained according to the above process can be used as an electrolyte membrane of a fuel cell.

The thickness of the polymer electrolyte membrane according to an embodiment of the present invention may be in the range of 5 to 200 μm. When the thickness of the polymer electrolyte membrane is less than 5 μm, it is too thin and likely to become torn. When the thickness of the polymer electrolyte membrane is greater than 200 μm, the polymer electrolyte membrane may have cracks.

A fuel cell according to an embodiment of the present invention comprises a cathode, an anode, and a polymer electrolyte membrane interposed between the cathode and the anode.

The cathode and the anode are formed of a gas diffusion layer and a catalyst layer.

Figure 1:
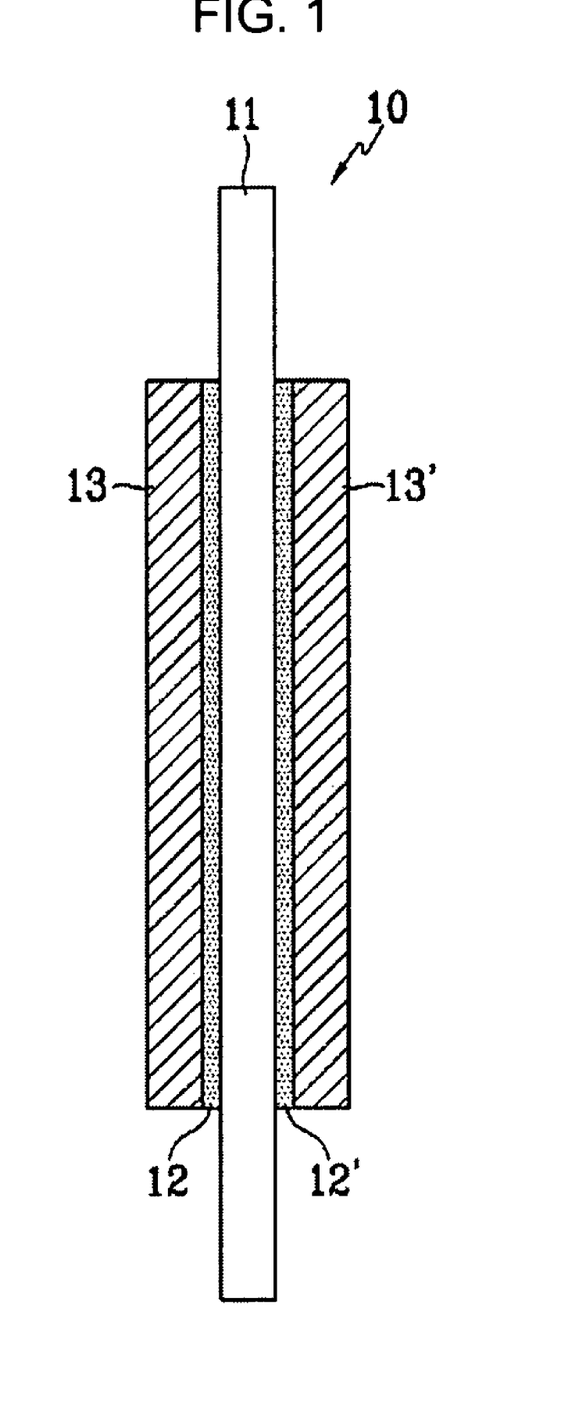
FIG. 1 is a schematic drawing of a membrane electrode assembly according to an embodiment of the present invention.

In one embodiment, referring to FIG. 1, the membrane-electrode assembly 10 includes a polymer electrolyte membrane 11, catalyst layers 12, 12' on both surfaces of the polymer electrolyte membrane 11, and gas diffusion layers 13, 13' disposed on the outside surfaces of the catalyst layers 12, 12'.

In one embodiment, the catalyst layer includes a metal catalyst facilitating reactions (oxidization of hydrogen and reduction of oxygen) as a catalyst and includes at least one catalyst selected from the group consisting of platinum, ruthenium, osmium, platinum-osmium alloy, platinum-palladium alloy, and platinum-M alloy (M is at least one transition metal selected from the group consisting of Ga, Ti, V, Cr, Mn, Fe, Co, Ni, Cu, and Zn), and preferably at least one selected from platinum, ruthenium, osmium, platinum-osmium alloy, platinum-palladium alloy, and platinum-cobalt alloy, and platinum-nickel alloy.

Also, in an embodiment, the metal catalyst is supported by a carrier. The carrier may be carbon such as acetylene black or graphite, or inorganic fine particles such as alumina or silica. When a precious metal supported in a carrier is used as a catalyst, a commercial product may be used or a precious metal may be supported in a carrier to be used in the present invention.

The gas diffusion layer may be carbon paper or carbon cloth, but is not limited thereto. The gas diffusion layer supports the electrodes for the fuel cell and diffuses gas using the catalyst layer so that the reaction gas can easily approach the catalyst layer. In an embodiment, the gas diffusion layer may be carbon paper or carbon cloth which is coated hydrophobically with a fluoride resin such as polytetra fluoro ethylene so as to prevent reduction in gas diffusion efficiency by water which is generated during the operation of the fuel cell.

Also, the electrodes (the cathode and anode) may further include a microporous layer between the gas diffusion layer and the catalyst layer to improve the gas diffusion effect of the gas diffusion layer. The microporous layer is formed by coating a composition including a conductive material such as carbon powder, carbon black, active carbon, acetylene black, etc., a binder such as polytetrafluoroethylene, and an ionomer, when necessary.

The fuel cell according to the current embodiment of the present invention may contain phosphoric acid, polymer electrolyte, or alkaline, preferably a DMFC.

Hereinafter, the present invention will be described in detail with reference to the examples below. However, these examples are for illustrative purposes only and are not intended to limit the scope of the present invention.

Example 1

(1) Synthesis of Polyamic Acid having a Reactive Terminal Group 10.01 g of 4,4'-diaminophenylether (ODA) and 57.5 g of N-methyl-2-pyrrolidone (NMP) were input sequentially to a 1 l round-bottomed jacket reactor, stirred slowly and dissolved completely. The temperature of the jacket of the reactor was maintained at 20° C. and 13.18 g of 4,4'-oxydiphthal acid anhydride (ODPA) was input slowly and agitated to dissolve. Then the mixed solution was stirred for 2 hours to react sufficiently, and then 1.47 g of maleic acid anhydride (MA) was added slowly, and stirred for 16 hours at room temperature to obtain polyamic acid in the liquid state. The average polymerization of the polyamic acid was 35.

(2) Preparation of Polymer Electrolyte Membrane 30 parts by weight of sulfonated poly(arylene ether sulfone) having an average polymerization of Formula 2 of 250, 70 parts by weight of polyamic acid having a reactive terminal group manufactured in (1) as an ion conductive polymer, and 400 parts by weight of N-methyl-2-pyrrolidone (NMP) as a solvent were mixed to prepare a composition for a polymer electrolyte membrane.

The composition for the polymer electrolyte membrane was spin-coated and then pre-heated at 100° C. for 10 minutes.

The result was then heated at about 250° C. for 1.5 hours to prepare a polymer electrolyte membrane (membrane thickness: about 35 μm).

Example 2

A polymer electrolyte membrane (membrane thickness: about 34 μm) was prepared according to Example 1, except that 40 parts by weight of sulfonated poly(arylene ether sulfone) having an average polymerization of Formula 2 of 250, and 60 parts by weight of polyamic acid having a reactive terminal group manufactured in (1) as an ion conductive polymer were used.

Example 3

A polymer electrolyte membrane (membrane thickness: about 36 μm) was prepared according to Example 1, except that 50 parts by weight of sulfonated poly(arylene ether sulfone) having an average polymerization of Formula 2 of 250, and 50 parts by weight of polyamic acid having a reactive terminal group manufactured in (1) as an ion conductive polymer were used.

Example 4

A polymer electrolyte membrane (membrane thickness: about 37 μm) was prepared according to Example 1, except that 60 parts by weight of sulfonated poly(arylene ether sulfone) having an average polymerization of Formula 2 of 250, and 40 parts by weight of polyamic acid having a reactive terminal group manufactured in (1) as an ion conductive polymer were used.

Example 5

A polymer electrolyte membrane (membrane thickness: about 36 μm) was prepared according to Example 1, except that 70 parts by weight of sulfonated poly(arylene ether sulfone) having an average polymerization of Formula 2 of 250, and 30 parts by weight of polyamic acid having a reactive terminal group manufactured in (1) as an ion conductive polymer were used.

Example 6

A polymer electrolyte membrane (membrane thickness: about 35 μm) was prepared according to Example 1, except that 50 parts by weight of sulfonated poly(arylene ether sulfone) having an average polymerization of Formula 2 of 250, 50 parts by weight of polyimide having a reactive terminal group manufactured in (1) as an ion conductive polymer were used, and 10 parts by weight of the compound represented by Formula 6 was added as solid acid.

Example 7

A polymer electrolyte membrane (membrane thickness: about 36 μm) was prepared according to Example 1, except that 5-norbornene-2,3-dicarboxylic anhydride (NDA) was used instead of maleic acid anhydride to prepare a polyamic acid.

Example 8

A polymer electrolyte membrane (membrane thickness: about 38 μm) was prepared according to Example 1, except that 2,3-dimethylmaleic anhydride (DMMA) was used instead of maleic acid anhydride to prepare a polyamic acid.

Example 9

A polymer electrolyte membrane (membrane thickness: about 34 μm) was prepared according to Example 1, except that citraconic anhydride (CA) was used instead of maleic acid anhydride to prepare polyamic acid.

Example 10

A polymer electrolyte membrane (membrane thickness: about 32 μm) was prepared in the same manner as in Example 1, except that sulfonated poly(arylene ether sulfone) having an average polymerization of Formula 3 of 200 was used as an ion conductive polymer.

Comparative Example 1

A composition for a polymer electrolyte membrane was prepared by mixing 100 parts by weight of sulfonated poly (arylene ether sulfone) having an average polymerization of Formula 2 of 250 as an ion conductive polymer and 400 parts by weight of N-methyl-2-pyrrolidone (NMP) as a solvent.

The composition for the polymer electrolyte membrane was spin-coated and then pre-heated at 100° C. for 10 minutes.

Then the resulting material was heated at 100° C. for about 1.5 hours to prepare a polymer electrolyte membrane (membrane thickness: about 34 μm).

Evaluation Example 1

Measurement of Ion Conductivity and Transmittance of Methanol

Ion conductivity and transmittance methanol of the polymer electrolyte membranes obtained from Examples 1 through 10 and Comparative Example 1 were measured and the results thereof are listed in Table 1 below. Here, the ion conductivity was calculated by dipping the prepared polymer electrolyte membranes into distilled water for 24 hours, and then disposing the polymer electrolyte membranes between electrodes, applying alternating current from 4 MHz to 1 Hz using an impedance analyzer with a 2-point probe method (amplitude 10 mV), measuring complex impedance at each frequency, and using the equation below as the resistance value of the measured polymer electrolyte membranes.

$$\sigma = I/(R \times S) \quad \text{Equation 1}$$

where σ is ion conductivity, I is the thickness of a sample, R is membrane resistance, and S is the surface area of the electrodes.

Transmittance of methanol was measured using diffusion cells at room temperature. Each of the polymer electrolyte membranes was inserted between two cells, methanol and water were continuously stirred, and the amount of methanol and water having a predetermined concentration transmitted by the polymer electrolyte membrane was picked at intervals of 15 minutes for 2 hours to evaluate using a gas chromatography analysis.

TABLE 1

| | Weight ratio of ion conductive polymer:polyimide having reactive terminal group | Thickness of polymer electrolyte membrane (μm) | Ion conductivity (S/cm) | Transmittance of methanol (cm²/s) |
|---|---|---|---|---|
| Example 1 | 3:7 | 35 | $1.36 \times 10^{-7}$ | $3.2 \times 10^{-6}$ |
| Example 2 | 4:6 | 34 | $5.66 \times 10^{-6}$ | $6.4 \times 10^{-6}$ |
| Example 3 | 5:5 | 36 | $9.81 \times 10^{-5}$ | $8.5 \times 10^{-6}$ |
| Example 4 | 6:4 | 37 | $6.02 \times 10^{-4}$ | $1.2 \times 10^{-7}$ |
| Example 5 | 7:3 | 36 | $4.14 \times 10^{-4}$ | $3.6 \times 10^{-6}$ |
| Example 6 | 5:5 | 35 | $0.9 \times 10^{-3}$ | $9.2 \times 10^{-6}$ |
| Example 7 | 3:7 | 36 | $2.66 \times 10^{-7}$ | $3.1 \times 10^{-8}$ |
| Example 8 | 3:7 | 38 | $2.43 \times 10^{-7}$ | $3.4 \times 10^{-8}$ |
| Example 9 | 3:7 | 34 | $1.78 \times 10^{-7}$ | $2.5 \times 10^{-8}$ |
| Example 10 | 3:7 | 32 | $3.56 \times 10^{-7}$ | $2.3 \times 10^{-8}$ |
| Comparative Example 1 | 10:0 | 34 | $2.44 \times 10^{-2}$ | $2.2 \times 10^{-6}$ |

As is evident from Table 1, the polymer electrolyte membrane including polyimide having a reactive terminal group shows much lower methanol transmittance and lower ion conductivity compared to a conventional polymer electrolyte membrane; however, the ion conductivity can be improved by adding solid acid as in Example 5.

According to the present invention, a polymer electrolyte forming an interpenetrating polymer network (IPN) of a polymer by simple blending of a hydrophobic polyimide and a hydrophilic aromatic polymer having ion conductivity, having reduced swelling properties due to highly dense crosslinking of polyimide through the reactive terminal group, showing high ion conductivity at low humidity, and having methanol crossover suppressing ability can be obtained, and accordingly, a fuel cell with improved electric and mechanical properties can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A polymer electrolyte membrane comprising an interpenetrating polymer network comprising:

the crosslinked product of a polyimide having a reactive terminal group; and an ion conductive polymer, wherein the crosslinked product of the polyimide is formed in the presence of the ion conductive polymer to thereby form the interpenetrating polymer network, and wherein the polyimide is a compound having a repeating unit represented by Formula 1 below:

Formula 1 where m is in the range of 0.01 to 1, n is in the range of 0 to 0.99, and m+n=1;

average copolymerization p is in the range of 10 to 10,000;

X and X' are each independently

Y and Y' are each independently

-continued $X_1, X_2, X_3, X_4, X_5, X_6, X_7, X_8, Y_1, Y_2, Y_3, Y_4, Y_5, Y_6, Y_7, Y_8, R_1, R_2, R_3$, and $R_4$ are each independently selected from the group consisting of a hydrogen atom, a halogen atom, a $C_1$-$C_{30}$ alkyl group, a $C_1$-$C_{30}$ halogenated alkyl group, a $C_6$-$C_{30}$ aryl group, and a $C_6$-$C_{30}$ halogenated aryl group;

$R_5$ and $R_6$ are each independently selected from the group consisting of a $C_1$-$C_{10}$ alkylene group and a $C_1$-$C_{30}$ halogenated alkylene group;

Q and Q' each independently represent simply a chemical bond or are each a group selected from the group consisting of —O—, —CO—, —SO$_2$, —S—, (T)$_a$-, —(OT)$_a$-, -(TO)$_a$—, and -(OTO)$_a$—where T is an alkylene group substituted with one selected from a halogen atom and $C_1$-$C_{10}$ halogenated alkyl group or an arylene group substituted with one selected from a halogen atom and C1-C10 halogenated alkyl group, and a is an integer in the range of 1 to 10;

Z and Z' are each independently selected from C, Si, Ge, Sn, and Pb; and

E is a univalent reactive terminal group having a carbon-carbon double bond or triple bond, derived from a monoamine compound or monoanhydride compound.

2. The polymer electrolyte membrane of claim 1, wherein X and X' are each independently selected from the group consisting of , and

.

3. The polymer electrolyte membrane of claim 1, wherein Y and Y' are each independently selected from the group consisting of 4. The polymer electrolyte membrane of claim 1, wherein E is derived from at least one compound independently selected from the group consisting of 5-norbornene-2,3-dicarboxylic anhydride (NDA), 3,4,5,6-tetrahydrophthalic anhydride, cis-1,2,3,6-tetrahydrophthalic anhydride, maleic anhydride (MA), 2,3-dimethylmaleic anhydride (DMMA), citraconic anhydride (CA), itaconic anhydride (IA), maleic imide, and ethynyl aniline (EA).

5. The polymer electrolyte membrane of claim 1, wherein the ion conductive polymer is an aromatic polymer having an ionic group.

6. The polymer electrolyte membrane of claim 1, wherein the ion conductive polymer is at least one selected from the group consisting of sulfonated poly(arylene ether sulfone), sulfonated poly(arylene ether ketone), sulfonated polyetheretherketone, sulfonated polyethersulfone, sulfonated polyetherethersulfone, perfluorinated polymer, polyvinylidene fluoride, polyvinylidene fluoride-co-hexafluoro propylene, copolymers including at least one monomer constituting the above polymers, and combinations thereof.

7. The polymer electrolyte membrane of claim 1, wherein the content of the polyimide is in the range of 20 to 400 parts by weight based on 100 parts by weight of the ion conductive polymer.

8. A polymer electrolyte membrane comprising an interpenetrating polymer network comprising:
the crosslinked product of a polyimide having a reactive terminal group;
an ion conductive polymer; and
a solid acid.

9. The polymer electrolyte membrane of claim 8, wherein the solid acid is one of compounds represented by Formulae 4 through 6 below:

Formula 4

Formula 5

Formula 6

10. A fuel cell comprising:

a cathode;

an anode; and a polymer electrolyte membrane interposed between the cathode and the anode, wherein the polymer electrolyte membrane is a polymer electrolyte membrane of claim 1.

11. The fuel cell of claim 10, wherein the cathode has a platinum-supported carbon catalyst, and the anode has a platinum/ruthenium-supported carbon catalyst.

* * * * *

UNITED STATES PATENT AND TRADEMARK OFFICE
CERTIFICATE OF CORRECTION

| | |
|---|---|
| PATENT NO. | : 8,057,952 B2 |
| APPLICATION NO. | : 11/651828 |
| DATED | : November 15, 2011 |
| INVENTOR(S) | : Myung-sup Jung et al. |

It is certified that error appears in the above-identified patent and that said Letters Patent is hereby corrected as shown below:

In the Claims

Column 22, Claim 1, line 16.        Delete "$C_1$-$C_{10}$"

Insert -- $C_1$-$C_{30}$ --

Signed and Sealed this
Fourth Day of December, 2012

David J. Kappos
*Director of the United States Patent and Trademark Office*